(12) United States Patent
Puttu et al.

(10) Patent No.: US 7,817,564 B2
(45) Date of Patent: Oct. 19, 2010

(54) METHOD AND SYSTEM FOR HANDLING FAULT MESSAGES IN A NETWORK

(75) Inventors: Sathyanarayana Nagendra Puttu, Bangalore (IN); Lakshmana Tirtha Katte Simha Vishnu Kiran, Bangalore (IN); Aravind Shamanna, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 692 days.

(21) Appl. No.: 11/496,171

(22) Filed: Jul. 31, 2006

(65) Prior Publication Data
US 2008/0025227 A1    Jan. 31, 2008

(51) Int. Cl.
*G01R 31/08* (2006.01)
(52) U.S. Cl. ...................................... 370/242
(58) Field of Classification Search ................. 370/242
See application file for complete search history.

(56) References Cited

U.S. PATENT DOCUMENTS 7,636,038 B1* 12/2009 Nof et al. ..................... 340/506
2002/0001307 A1* 1/2002 Nguyen et al. ............... 370/386
2004/0120250 A1* 6/2004 Langevin et al. ............. 370/216
2006/0036866 A1* 2/2006 Nagendra et al. ........... 713/181
2006/0095815 A1* 5/2006 Noy et al. ..................... 714/712

OTHER PUBLICATIONS

Risto Varandi, Tools and techniques for event log analysis, Thesis, Tallinn University of Technology, Jun. 17, 2005, 47 pages.

* cited by examiner

*Primary Examiner*—Jason E Mattis
*Assistant Examiner*—Stephen J Clawson
(74) *Attorney, Agent, or Firm*—Trellis IP Law Group, PC

(57) ABSTRACT

A method and a system for handling fault messages in a network where a network device publishes fault messages related to the principal cause of the fault. The messages are received by a Network Management System (NMS) that identifies the source of the fault and sends a multicast message to other network devices managed by the NMS. The multicast message comprises information regarding the fault. In response to the multicast message, the other network devices determine whether to publish or drop related fault messages.

20 Claims, 5 Drawing Sheets

METHOD AND SYSTEM FOR HANDLING FAULT MESSAGES IN A NETWORK

BACKGROUND OF THE INVENTION

1. Field of Invention

Embodiments of the invention relate, in general, to network management. More specifically, the embodiments of the invention relate to methods and systems for handling fault messages in a network.

2. Description of the Background Art

A network connects various network devices and allows them to communicate with each other. A Network Management System (NMS) is connected to the network devices to manage configuration, accounting, performance, security, and network faults. Faults are network events that reduce the network's performance. Examples of faults include a port going down, a link going down, and unavailability of a network card that is being pulled out from a network device. When a fault occurs at a network device, the network device raises fault messages, herein referred to as source fault messages, and other network devices raise fault messages, herein referred to as related fault messages. These multiple fault messages are all conveyed to the NMS. Many, if not most, of these multiple fault messages are redundant and provide no meaningful information. The NMS must process the multiple fault messages to determine the principal cause of the fault by correlating the multiple fault messages. Then based on the principal cause, the NMS takes an appropriate action to protect the network from effects of the fault. Examples of appropriate action may be to update routing tables to bypass the source device and send alerts to network administrators identifying the source network device.

In conventional techniques, the NMS stores the multiple fault messages in a database and correlates the stored fault messages. The correlation tasks consume a lot of network resources such as CPU time, memory, disk space, administrator time and so forth. Conventional techniques for correlating the fault messages include rule-based correlation, codebook correlation, and manual correlation. Due to the complexity, the correlation process can often be time consuming which leads to an increase in network downtime. Moreover, the NMS typically discards some fault messages if the number of the fault messages received by the NMS is more than the capacity of the NMS thereby complicating the task of determining the principal cause of the fault messages.

DETAILED DESCRIPTION OF EMBODIMENTS OF THE INVENTION

Figure 1:
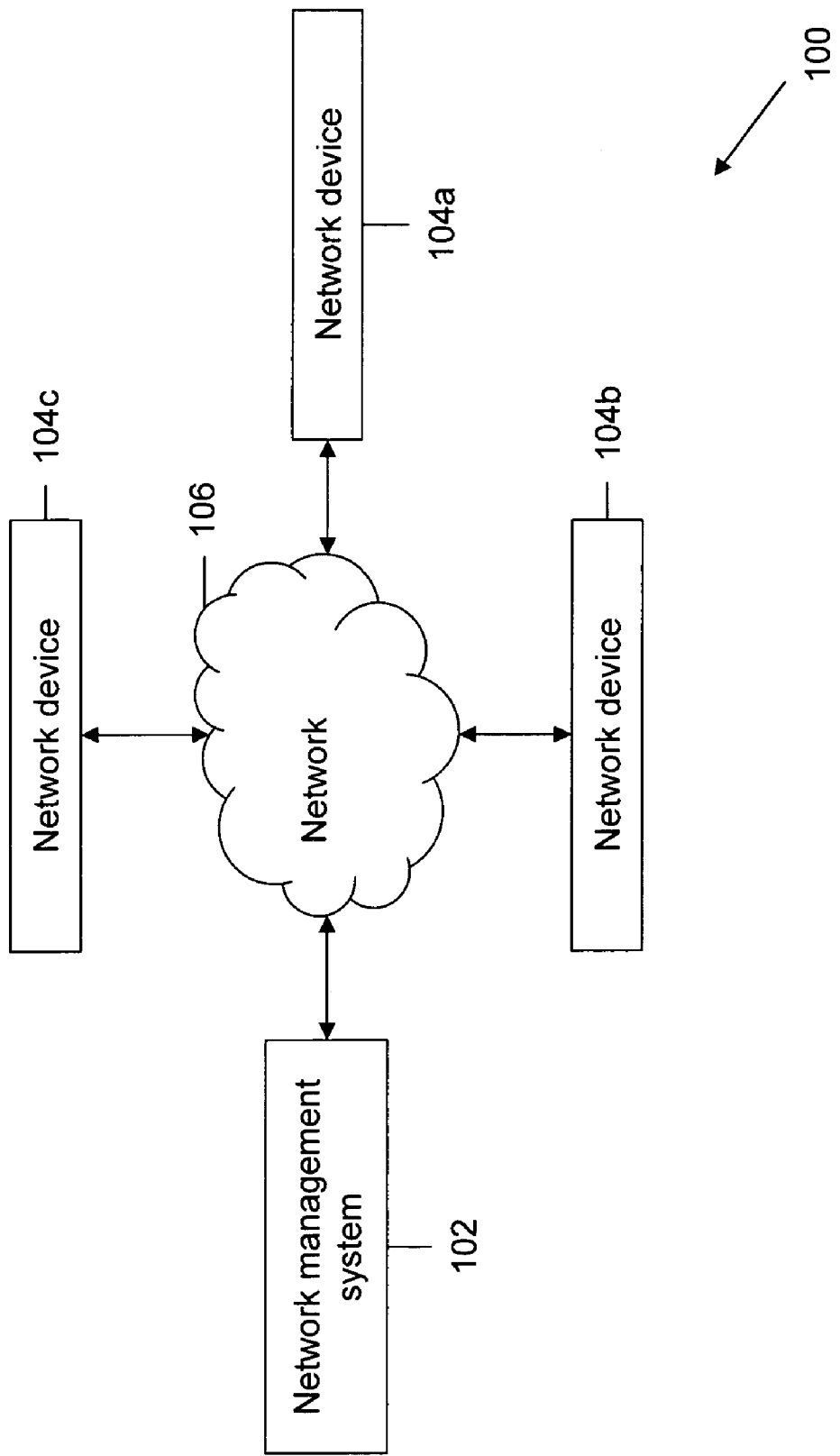
FIG. 1 illustrates an environment for implementing various embodiments of the invention.

Embodiments of the invention provide methods, systems, and computer-readable media for handling fault messages in a network. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A network can include network devices connected together to communicate with each other and a Network Management System or Station (NMS). One of the functions handled by the NMS is to identify faults in the network and initiate corrective action. When a fault occurs on a network device, herein referred to as a source device, one or more fault messages are communicated to the NMS. Examples of fault messages include System Log (Syslog) messages, Simple Network Management Protocol (SNMP) traps, etc. The fault messages generated by the source device are related to a principal cause of the fault.

Other network devices may also detect a problem with the source device and generate related fault messages of their own. Each network device holds the related fault messages for a short period of time before sending them to the NMS.

In one embodiment, upon receipt of the source fault message, the NMS correlates the principal cause of the fault and sends a multicast message to the other network devices. The multicast message includes information regarding the fault and the source network device, to the other network devices. More specifically, the information includes details regarding the principal cause of the fault, details regarding the source device, details regarding the network events that occurred due to the fault, and so forth. Each of the network devices uses the information in the multicast message to determine an appropriate course of corrective action. Specifically, the network devices may reconfigure their routing table and stop sending related fault messages to the NMS in order to reduce the number of fault messages that are received by the NMS in response to the fault. Fewer messages reduce the storage requirements at the NMS, free up bandwidth and improve the fault correlation process.

In another embodiment, if receipt of the source fault messages is prevented by, for example, the source network device losing power, then NMS will not receive any source fault messages. Accordingly, the NMS must correlate the related fault messages to determine the principal cause of the fault. Once the NMS is able to determine the source of the fault, it sends a multicast message to the other network devices in order to minimize the amount of related fault messages that are generated and sent to the NMS.

Referring now to the drawings, more particularly by their reference numbers, FIG. 1 illustrates environment 100 for implementing various embodiments of the invention. Environment 100 includes NMS 102, a plurality of network devices 104, and network 106. Network devices 104 include network device 104*a*, network device 104*b*, and network device 104*c*. Examples of network devices 104 include routers, switches, hubs, and many other network infrastructure devices. Although only three network devices 104 are illustrated, it will be appreciated that any number of network devices 104 may be connected to the network.

Network devices 104 communicate through a network medium in network 106 to exchange information. The network medium can be Fiber Channel, Ethernet, the Internet and so forth. NMS 102 monitors, controls, and manages network 106 and network devices 104. Further, NMS 102 is responsible for managing faults occurring in network 106.

A fault is a network event that degrades the performance of network 106. Examples of faults include a port going down, a link going down, a card being pulled out from network device 104, or a cable being cut or disconnected. One of skill in the art will appreciate that other network events are possible but are not specifically listed herein for the sake of simplicity. When a fault occurs, network devices 104 generate fault messages that are published to NMS 102 and other network devices 104. Examples of fault messages include System Log (Syslog) messages for logging data or Simple Network Management Protocol (SNMP) traps.

Multiple fault messages are typically generated when a fault occurs. To illustrate what happens during a network event where a network interface card is disconnected from network device 104*a* (i.e., the network event), various fault messages occur. The fault messages that are expected to occur from the network event include fault messages regarding a port down from network device 104*a*, fault messages regarding links down from network device 104*a*, fault messages regarding link down from network device 104*b*, and link down from network device 104*c*. fault messages regarding OSPF neighbor down from directly connected devices (if an OSPF adjacency had been established with this device) and fault messages regarding additional OSPF neighbor down messages from other network devices 104 on either side of the link which went down. OSPF refers to Open Shortest Path First which is a link-state, hierarchical Interior Gateway Protocol (IGP) routing protocol within an autonomous system, Internet Service Provider (ISP) or other area. Further, NMS 102 receives fault messages regarding BGP neighbor down from directly connected devices and BGP neighbor down messages from network devices 104 on either side of the link which went down. BGP refers to the Border Gateway Protocol (BGP) which is an interautonomous system routing protocol for a network 106 or group of networks under a common administration and with common routing policies. BGP is used to exchange routing information for the Internet and is the protocol used between Internet service providers (ISP).

Note that the above examples are not an exhaustive description and in other networks additional syslog messages may be generated depending on the configuration. Additional syslog messages could include syslog for HSRP (Hot Standby Router Protocol) standby device becoming active, syslog message indicating connectivity loss, syslog indicating frame-relay DLCI down and the like.

Each network device 104 generates fault messages related to these network events. By nature, fault messages are asynchronous messages that are published to notify network administrators or network management systems so that an appropriate remedial action is taken to ensure that there is minimal network down time. One of the problems with these asynchronous messages is that multiple messages are generated for a single network event.

The fault messages generated by network device 104*a*, where the card is disconnected are referred to as source fault messages. The source fault messages describe the principal or root cause of the fault.

The fault messages generated by network devices 104*b* and 104*c* are related to network event that occur because of the fault. The fault messages generated by network devices 104*b* and 104*c* are referred to as related fault messages. In accordance with an embodiment of the invention, The number of fault messages generated because of a single card being pulled out can run into hundreds to thousands depending on the size of network 106. All these messages are directed to NMS 102 and NMS 102 ends up with the demanding task of storing and processing these hundreds/thousands of messages, performing root cause analysis and correlation, taking actions for rules defined against specific messages, persisting the messages into database etc. These operations cause high CPU utilization, memory utilization, DB transactions etc on NMS 102 server thereby degrading its performance and over time the size of the DB grows into gigabits of storage. These tasks consume exorbitantly amounts of NMS 102 resources like CPU time, memory, disk space, and the like. Another downside is that if the number of messages being received by NMS 102 are more than what it can handle, NMS 102 starts dropping these messages and may fail to notify network administrators in a timely manner which can cause network down-time.

By delaying some of the messages directed toward NMS 102, NMS 102 can process the received fault messages and correlate the fault messages to determine the principal cause of the fault. Examples of correlation techniques used for correlating the fault messages include rule-based correlation, codebook correlation, manual correlation, and so forth. In rule-based correlation techniques, various 'if-then' rules are used to find out the principal cause of the fault. In codebook correlation techniques, a codebook matrix is used to find out the principal cause of the fault. Based on the correlation of the fault messages, NMS 102 determines the principal cause of the fault.

Figure 2:
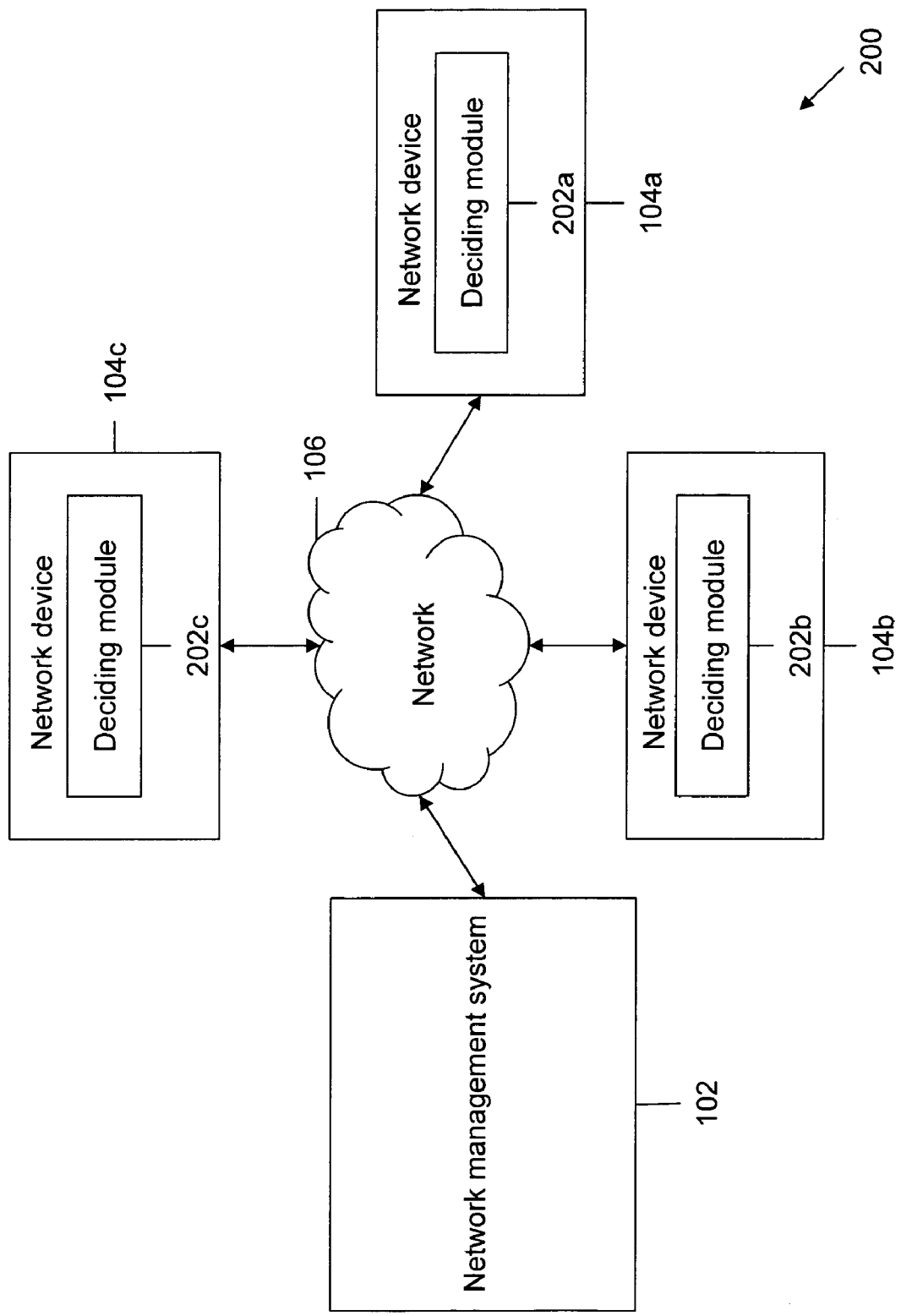
FIG. 2 is a block diagram of a system for handling fault messages in a network, in accordance with an embodiment of the invention.

FIG. 2 is a block diagram of system 200 for handling fault messages in network 106, in accordance with an embodiment of the invention. System 200 includes NMS 102, network devices 104, and network 106. Network devices 104 comprise deciding modules 202. In another embodiment of the present invention, deciding module 202 is present as an infrastructure component such as, Embedded Event Manager (EEM), in Internetwork Operating System (IOS). EEM is a feature in the IOS that allows a user to specify the behavior of system 200 when a network event occurs in network 106. The behavior may be described in the form of policies. The policies allow the user to customize network devices 104 to their operating systems. The policies may be of two types, for example, Tool Command Language (TCL) and Command Line Interface (CLI). TCL is a scripting language that has full programming capability. EEM includes a set of event detectors that cover a wide range of network events. Event detectors can be viewed as sensors in various parts of the IOS. Event detectors can publish network events on the basis of syslog messages. EEM uses various means to notify the behavior of system 200. Examples of these means include Electronic mail (e-mail) messages from the IOS, SNMP traps, and so forth.

The occurrence of a fault at network device 104*a* causes various network events in network 106. Network devices 104 generate multiple fault messages for these network events. The fault messages generated at network device 104*a* are source fault messages as they are related to the principal cause of the fault. Network device 104*a* sends the source fault messages to NMS 102. Note that related fault messages may be received from other network devices 104 substantially concurrently with the source fault messages. However, without the hundreds/thousands of fault messages flooding NMS 102, NMS 102 can quickly correlate the messages to determine the principal cause of the fault.

Thereafter, NMS 102 sends a multicast message to other network devices 104, including network devices 104*b* and 104*c*, in the same AS or common area. The multicast message includes information regarding the fault.

A multicast message is a message that is transmitted simultaneously to multiple recipients in network 106. In an embodiment of the present invention, the recipients belong to a multicast address group. The multicast address group is created dynamically when NMS 102 sends an SNMP command to network devices 104 requesting them to join the multicast address group. The SNMP command is sent when network devices 104 joins network 106 or when NMS 102 directly manages network devices 104. In another embodiment of the present invention, the recipients belong to an autonomous system. Network devices 104 in the autonomous system typically use a common Interior Gateway Protocol (IGP) to exchange routing information within an autonomous system. With IGP each network device 104 has a specific multicast address that is used by other network devices 104 and NMS 102 to exchange routing information. NMS 102 sends the multicast message to the network devices 104 present in the autonomous system. Other network devices 104 may pull the multicast message from the designated network devices 104.

Referring again to FIG. 1, network devices 104*b* and 104*c* generate fault messages related to the network event of the line card being disconnected. Fault messages generated by network devices 104 that are not the source of the network event are referred to as related fault messages.

Network devices 104*b* and 104*c* wait for a period of time before sending these related fault messages to NMS 102. In one embodiment of the present invention, the period of time is the transit time required by network devices 104 to receive a multicast message from NMS 102. If the multicast message is not timely received by network devices 104*b* and 104*c*, then the related fault messages generated by network devices 104*b* and 104*c* are sent to NMS 102. However, if the multicast message is received by network devices 104*b* and 104*c*, then deciding modules 202*b* and 202*c* determine an action to be performed on the related fault messages generated by network devices 104*b* and 104*c* respectively. The action is based on the information included in the multicast message regarding the fault. Specifically, if the network elements decide that NMS 102 is aware of the problem in network 106 by looking at the multicast message sent by NMS 102, they simply drop the syslog message. Only relevant and important messages are thus published to NMS 102.

The fault messages that are expected to be generated for network events are 1) a port down fault messages from the source network device 104*a*; 2) links down fault messages from source network device 104*a*; 3) link down fault messages from network device 104*b*; 4) link down messages from network device 104*c*; 5) OSPF neighbor down fault messages from directly connected devices (if an OSPF adjacency had been established with this device); and 6) additional OSPF neighbor down fault messages from other network devices 104 on either side of the link which went down.

Of the above six events only the first two fault messages are most significant and are the only two that need to be acted upon to resolve the fault scenario. The remaining four groups of related fault messages are all valid messages that do not directly provide any direct information to act upon and would only make the network administrator face a long and difficult time trying to troubleshoot what really happened. As explained earlier other syslog messages can be generated for a given event and the above list is merely to illustrate the response to a network event.

When a network event occurs, typically the source network device 104*a* notifies NMS 102 about the fault scenario by means of a syslog message. Directly connected network devices 104*b* and 104*c* wait for a period of time before deciding to raise a syslog message. The wait time should be enough time for the network devices 104*b* and 104*c* to receive a multicast message from NMS 102, which are at most a few milliseconds.

In the time window that the directly connected devices back-off before raising a syslog message, NMS 102 sends a multicast message to the network devices 104 in the AS or who are members of the multicast group. The message encompasses details such as identification of the port/ports or networks that are down.

Network devices 104 receive the multicast message from NMS 102 and perform computations triggered by routing protocol updates and other re-routing tasks. At this point in time, network devices 104 may raise a notification by means of a syslog message.

However, before raising the syslog message, network devices 104 do the following:
  a) check if network 106/networks are present in the multicast messages from NMS 102; and
  b) check if there are any impact in the path that these network/networks 106 are present by doing a topology computation.

These checks are additional checks that are provided in the topology computations of network devices 104. Moreover these checks can be moved to a supporting infrastructre component like the Embedded Event Manager (EEM). The device OS needs to make the data points that it used to determine whether a syslog needs to be raised or not to the EEM so that these checks can be made.

Based on the results of steps a) and b) the network element can determine that NMS 102 already knows about the fault condition and ignores or drops the syslog message from its send queue. Steps a) and b), above, are performed by all network devices 104 in network 106 and a fault correlation mechanism is established in network 106 to enable only the root cause faults to be notified to NMS 102. This reduces the number of syslog messages being sent to NMS 102 and enables NMS 102 to look at only those events that need to be acted upon. Depending on the size of network 106, the number of syslog messages generated drastically reduces and increases efficiencies on NMS 102 side in terms of processing, memory and space usage requirements and also enhance the performance of NMS 102.

In another embodiment of the present invention, an additional check is included in the topological computations of network devices 104 for determining the action to be performed on the related fault messages. The additional check verifies whether there is any impact of the fault on the path between network devices 104 and NMS 102. The action is to decide whether the related fault messages are to be dropped or not. The dropped messages are not sent to NMS 102. In an embodiment of the invention, deciding modules 202 decides the related fault messages to be dropped on the basis of the severity level of the related fault messages.

The severity level of a fault message is defined on the basis of information included in the fault message. Severity level is a number that indicates the severity of the fault message. For example, informational fault messages may be designated with a severity level of 6, 8, or 10; and error fault messages may be designated with a severity level of 12 or 16. Informational fault messages return status information or report errors that are not severe. Error fault messages indicate that severe errors, such as transaction deadlock errors, security-related errors, syntax errors, and so forth, have occurred in network 106. The fault messages with high severity level are typically related to the principal cause of the fault and may be published to NMS 102 whereas low severity level fault messages are not. Examples of low severity level fault messages include informational fault messages, debugging fault messages, etc. Examples of high severity level fault messages include fatal fault messages, critical fault messages, etc.

Figure 3:
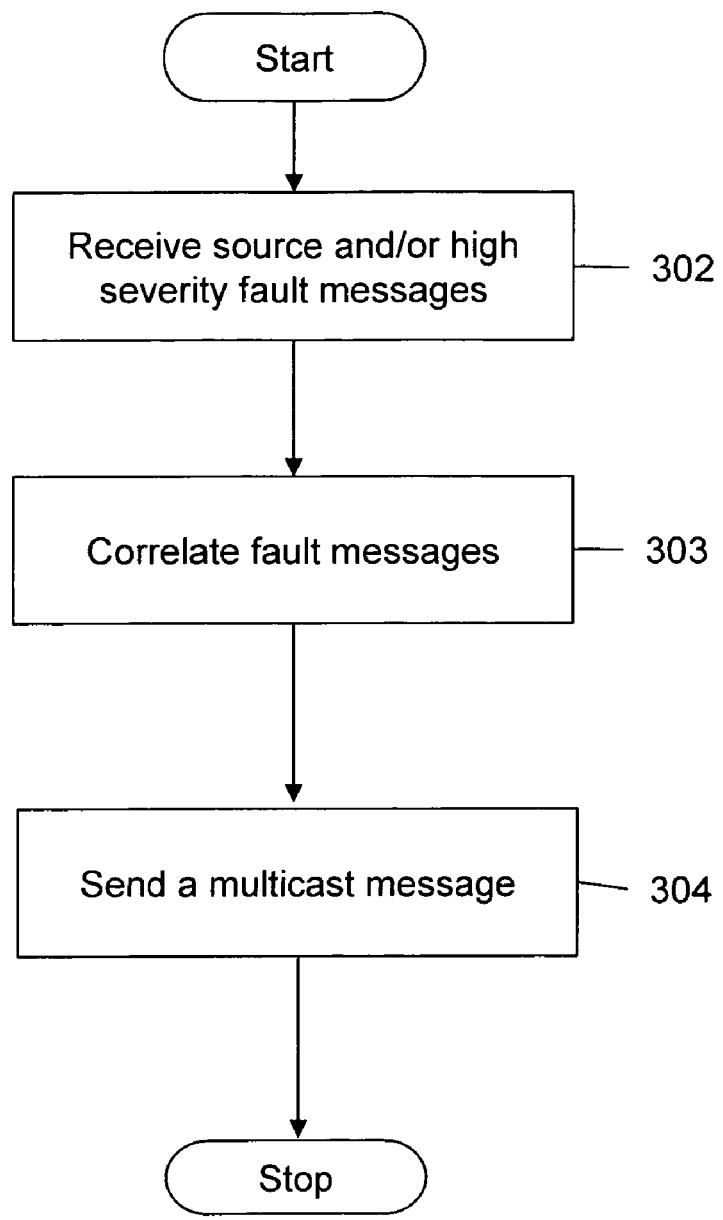
FIG. 3 is a flowchart, illustrating a method for handling fault messages in a network, in accordance with an embodiment of the invention.

FIG. 3 is a flowchart, illustrating a method for handling fault messages in network 106, in accordance with an embodiment of the present invention. At 302, source fault messages and/or high severity level fault messages from other network devices 104 are received by NMS 102. At 303, NMS 102 correlates the source fault messages and/or the high severity fault messages. Thereafter, at 304, a multicast message is sent by NMS 102 to the network devices 104 in the multicast group. The multicast message includes information regarding the fault. Further, deciding modules 202b and 202c determine an action to be performed on the fault messages generated at network devices 104b and 104c based on the information regarding the fault.

Figure 4:
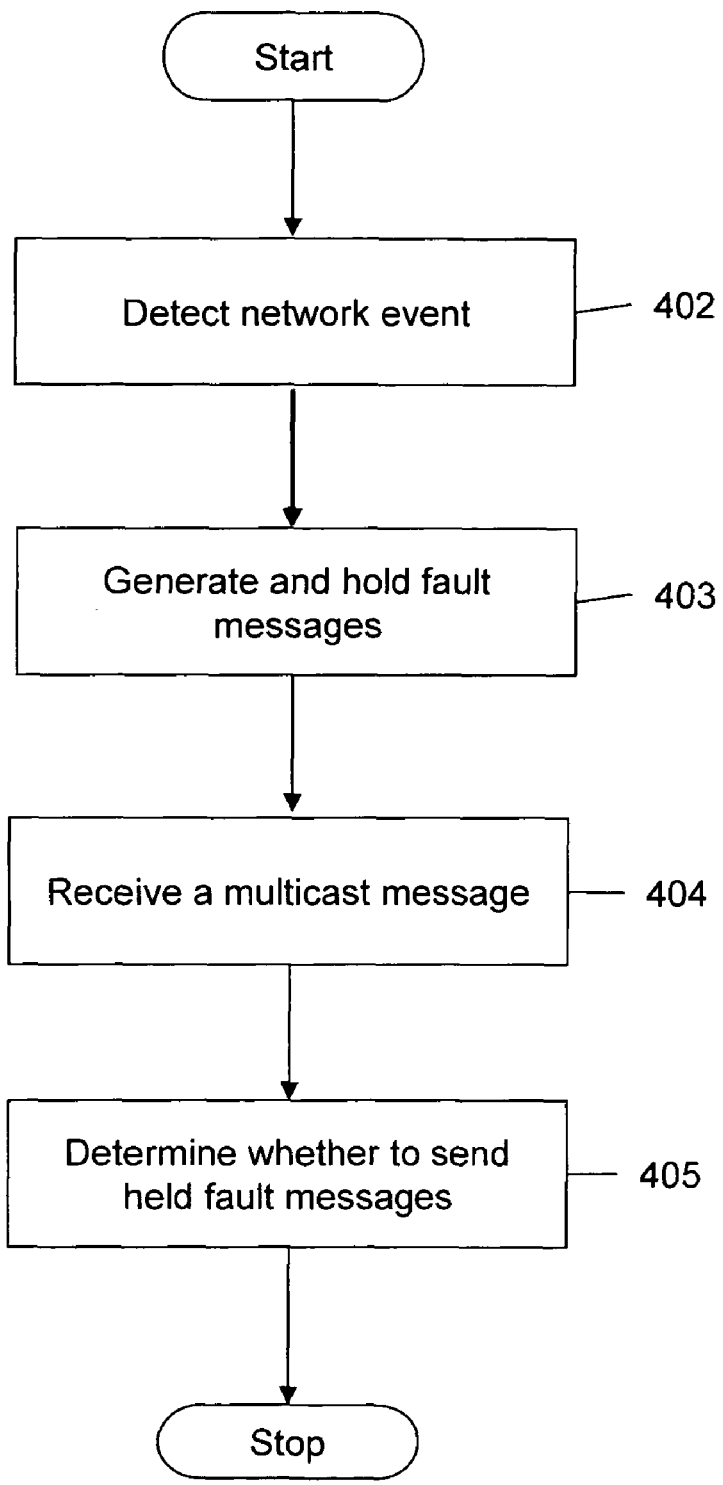
FIG. 4 is a flowchart, illustrating a method for handling fault messages in a network, in accordance with another embodiment of the invention.

FIG. 4 is a flowchart illustrating a method for handling fault messages at a network device 104 other than the source network device 104a, in accordance with another embodiment of the present invention. At 402, a network event is detected by various network devices 104. At 403, fault messages are generated but not published for a selected period of time. At 404, a multicast message is received by network devices 104b and 104c. At 405, the non-source network devices 104b and 104c decide whether to publish the held fault messages. The decision is based on the information in the multicast message regarding the fault at the source network device 104a.

Figure 5:
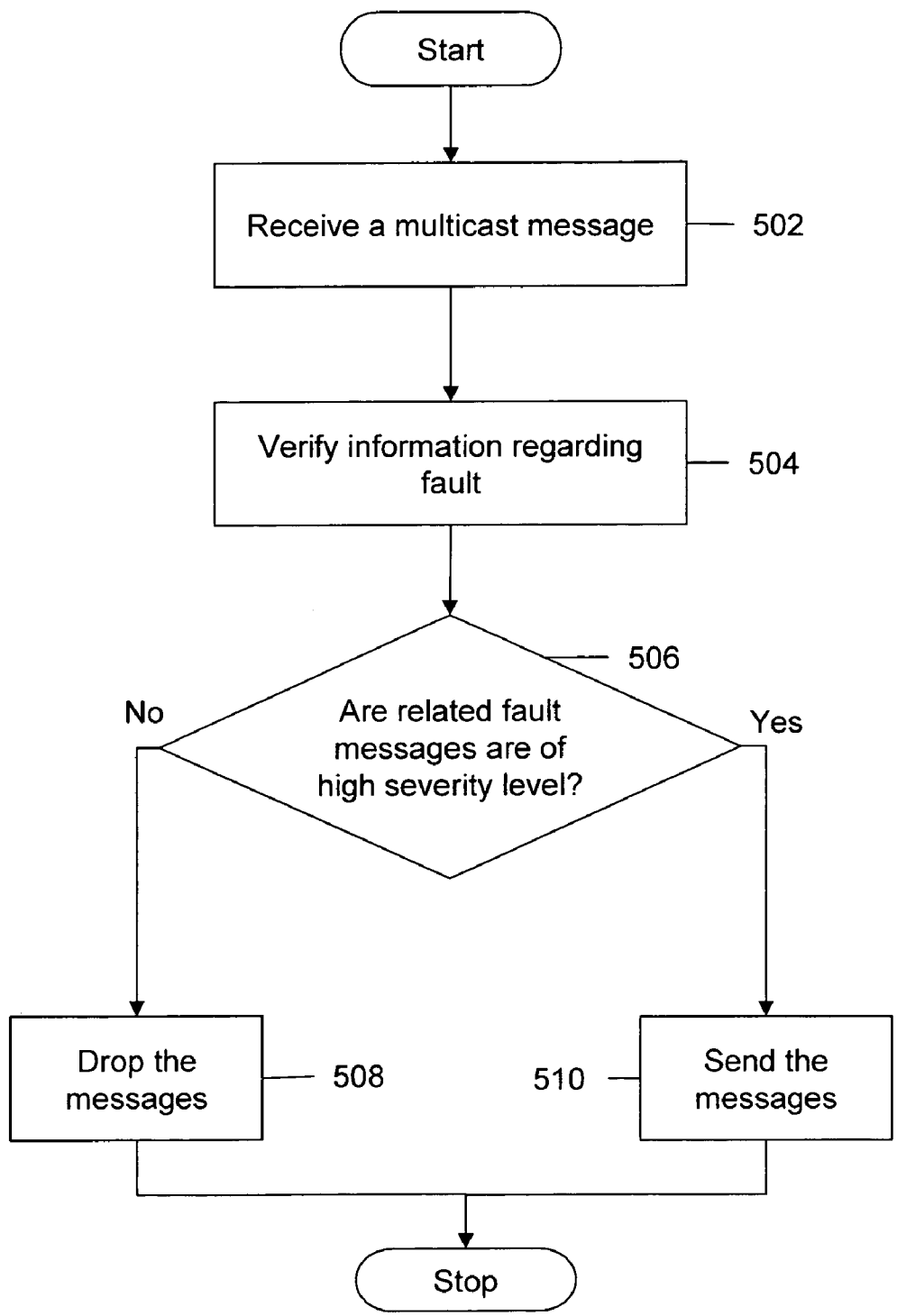
FIG. 5 is a flowchart, illustrating a method for handling fault messages in a network, in accordance with yet another embodiment of the invention.

FIG. 5 is a flowchart illustrating a method for handling fault messages at a network device 104 other than the source network device 104a in network 106, in accordance with yet another embodiment of the present invention. At 502, a multicast message is received at network devices 104b and 104c. The multicast message includes information regarding the fault that has occurred at network device 104a. At 504, the information regarding the fault is verified. The information regarding the fault is verified separately by deciding modules 202b and 202c. On the basis of this verification, at 506, deciding modules 202b and 202c determine whether the related fault messages generated at network devices 104b and 104c, respectively, are of high severity level. Thereafter, at 510, the related fault messages are sent to NMS 102, if the related fault messages are of high severity level. Further, if the related fault messages are of low severity level then at 508, the related fault messages are dropped and are not sent to the NMS 102.

In order to send a multicast message, a new multicast address group involving NMS 102 and network devices 104 in a common AS (or that are managed by NMS 102) is created. Network devices 104 may dynamically join the group after being managed in NMS 102 with NMS 102 instructing the device by an SNMP set command on a SNMP variable, such as by way of example, "joinNMGroup" to set a value of 1. This set command is issued the first time NMS 102 manages network device 104. On deleting one of network devices 104 from the multicast group, NMS 102 instructs network device 104 to dissociate from the group by setting the same SNMP variable, "joinNMGroup" to a value of 0.

Note that at the time of managing the device, NMS 102 also gathers information about the ports, the forward entities like routing tables, Address Resolution Protocol (ARP) tables, and so forth from the device as part of its physical/logical inventory that it uses for creating the multicast message. This information is further used by NMS 102 while sending the multicast message.

In another embodiment, other approaches for setting up the multicast group are possible. Typically, the routers in an autonomous system are all running the same IGP with a standard multicast address that all routers use to exchange routing updates. For example: OSPF uses multicast address 224.0.0.5 (all routers) and 224.0.0.6 (only designated routers). In the specific OSPF network, the source network device 104a where the card is being pulled out (see the example above) sends a syslog to NMS 102 and NMS 102 sends a multicast message just to the designated routers (at 224.0.0.6) and all other routers pull this message from the designated routers and act upon it.

Similarly, other multicast addresses can be used when the routers in network 106 are running different IGPs (224.0.0.9 for RIP, 224.0.0.10 for IGRP etc). It should be noted that one limitation of this approach is that other network elements like switches etc are excluded from the multicast message. Accordingly, a different approach would be needed to publish the messages to these devices.

The onus of initiating the formation of the multicast group lies with NMS 102, which is configurable. If the multicast notification process is enabled, then NMS 102 instructs network devices 104 to join the multicast group, if it is disabled then multicast group formation will not happen and all network devices 104 default to a mode that is compatible with the prior art.

Note that syslog messages are generated due to a host of reasons like change of configuration, access list actions etc. However, this feature is primarily used for identification of critical hardware events like port going down, card being pulled out etc. Also the focus of the invention is to efficiently handle syslog messages at NMS 102 side. There may be other types of faults being generated in network 106, this invention does not aim or attempt to solve all types of fault correlation problems. The focus of the invention is to enable a mechanism whereby NMS 102 works with network devices 104 to preempt a flood of syslog messages to it and efficiently handle the syslog messages.

Preferably, there are redundant communication paths in network 106 for messages to reach NMS 102 and other network devices 104 despite the fault condition. In case some elements get isolated due to the fault condition and are unable to receive the multicast messages, they may send syslog messages as usual to NMS 102 or they may be unable to send the syslogs due to connectivity issues. Network devices 104 are preferably configured for logging messages to NMS 102.

The ability of NMS 102 to uniquely identify and publish the acknowledgment of a fault scenario occurring at a specific network device 104 to other network devices 104 to proactively act upon it by dropping syslog messages that do not directly aid in resolving a fault condition and increase efficient processing of syslog messages on NMS 102 side is the novelty in the invention.

With the present invention only critical and relevant syslog messages are notified to NMS 102. Fewer fault messages of low relevance increases the efficiency of NMS 102 in terms of the number of fault messages being processed per second, CPU, memory and disk space consumption (in terms of database persistence). Advantageously, network 106 becomes capable of quickly isolating a fault condition down to the source, eases the troubleshooting efforts of the network administrators, and enables the network administrators to limit the network down-time to a minimal. To explain it further, let's consider one representative embodiment using a commercially available Resource Manager Essentials (RME) syslog application and a commercially available Sheer Networks fault management application, herein referred to as a sheer system. The RME syslog application comprises a syslog message receiver, and a syslog reporting functionality. The RME syslog application does not correlate the fault messages. However, the fault messages are saved in a separate log file by the syslog message receiver. Further, the syslog reporting functionality produces useful reports related to the status of network devices 104.

The sheer system performs correlation of fault messages by correlating all syslog messages or traps from network devices 104 and simulating a packet flow with the 0network model it creates within the application. The application routes a packet just like how the packet travels in a real network within the model that it creates and based on the syslog messages or traps received, if the flow happens to pass through the place where the problem occurred, it correlates these to one another. Now, consider the following scenario:

Network 106 Creates a Thousand Syslog Messages in a Second 1. the automated actions (via user written scripts) that RME syslog application is capable of invoking would take 16.67 minutes to go through each syslog message it receives.
2. The sheer system needs to perform path traces to do the correlation by simulating a packet flow within the in memory model of network 106 it has built. Assuming 1 second per path trace it would still take 16.67 minutes (could be more since path trace is involved) to process each of the syslog messages received and perform the correlation. 16.67 minutes is too long a time in the network and can lead to progressive delays to identify the root cause and fix it. However with the proposed invention, the correlation intelligence is distributed in network 106 and happens parallelly across all network devices 104 in network 106 thereby reducing the time significantly.

According to embodiments of the invention, a method for handling fault messages generated by a plurality of network devices due to a fault in a network is provided. The method comprises receiving fault messages that relate to the fault; correlating the fault messages to determine the principal cause of the fault; and sending a multicast message identifying the principal cause of the fault to network devices belonging to a multicast group before the network devices send related fault messages.

In another embodiment of the invention, a method for handling fault messages generated by a plurality of network devices due to a fault in a network is provided. The method comprises detecting a network event caused by the fault in the network; generating a related fault message; waiting for a selected period of time; and determining an action to be performed on the related fault message.

In another embodiment of the invention, a system for handling fault messages generated by a plurality of network devices due to a fault in a network is provided. The system comprises a Network Management System (NMS) and a plurality of network devices. The NMS adapted for receiving fault messages that related to the fault; correlating the fault messages to determine the principal cause of the fault; and sending a multicast message identifying the principal cause of the fault to network devices belonging to a multicast group before the network devices send related fault messages. Each of the network device adapted for detecting a network event caused by the fault in the network; generating a related fault message; waiting for a selected period of time; and determining an action to be performed on the related fault message Various embodiments of the invention provide an apparatus for handling fault messages generated by the network devices due to a fault in the network; the apparatus comprises a Network Management System (NMS) for correlating published fault messages and isolating a fault condition; and a plurality of network devices for limiting the number of published fault messages.

An embodiment of the present invention provides a method that increases efficiency of an NMS. Only those fault messages that are related to the principal cause of the fault are sent to the NMS, increasing the processing speed of the NMS and reducing disk space consumption. Further, the method provides reliability to the network since the NMS does not discard the fault messages. Moreover, the invention facilitates the NMS to reduce the network downtime. Although the invention has been discussed with respect to specific embodiments thereof, these embodiments are merely illustrative, and not restrictive, of the invention.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time,"

"offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nano engineered systems, components and mechanisms may be used. In general, the functions of the present invention can be achieved by any means as is known in the art. Distributed or networked systems, components and circuits can be used. Communication or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method, comprising:
   receiving fault messages in a network management station, NMS, the fault messages relating to a fault in a network coupled to the NMS, the network having a plurality of network devices, wherein the fault messages are generated by the network devices in response to detection of the fault in the network;
   correlating the fault messages in the NMS to determine a principal cause of the fault; and
   sending a multicast message from the NMS to each network device prior to termination of a selected period of time, the multicast message identifying the principal cause of the fault to network devices belonging to a multicast group, wherein the multicast message is used by each of the network devices in the multicast group to drop related fault messages for the fault in the network that would otherwise be sent after waiting for the selected period of time to elapse, thereby minimizing a number of fault messages received by the NMS.

2. The method of claim 1, further comprising defining the multicast group to receive the multicast message in response to the fault occurring in the network.

3. The method of claim 1, wherein the network devices receiving the multicast message drop the related fault messages if the related fault messages have a predetermined low severity level.

4. The method of claim 1, wherein the fault messages are Simple Network Management Protocol, SNMP, traps.

5. The method of claim 1, wherein the fault messages comprise System Log, Syslog, messages.

6. A method, comprising:
   receiving a multicast message from a network management station, NMS, in a network device that is part of a network with a plurality of network devices, the multicast message being sent by the NMS to each network device in a multicast group of network devices prior to termination of a selected period of time, the multicast message being sent by the NMS in response to fault messages relating to a fault in the network, the multicast message identifying a principal cause of the fault;
   detecting in the network device, a network event caused by the fault in the network;
   generating in the network device, a related fault message in response to the detected network event;
   waiting in the network device, for the selected period of time to elapse; and
   determining in the network device, an action to be performed on the related fault message in response to information about the fault from the received multicast message.

7. The method of claim 6, wherein the determining the action further comprises dropping the related fault message if the related fault message has a predetermined low severity level.

8. The method of claim 6, wherein the determining the action further comprises publishing the related fault message if the related fault message has a predetermined high severity level.

9. The method of claim 6, further comprising receiving the multicast message identifying the principal cause of the fault and dropping the related fault message if the multicast message is received during the selected period of time.

10. The method of claim 9, further comprising publishing the related fault message if the multicast message is not received during the selected period of time.

11. The method of claim 6, wherein the fault messages comprise System Log, Syslog, messages.

12. A method, comprising:
    generating fault messages in a source network device, the fault messages relating to a fault in a network that has a plurality of network devices, wherein the fault messages are generated by the source network device in response to detection of the fault in the network;
    sending the fault messages from the source network device to a network management station, NMS, wherein the NMS correlates the fault messages to determine a principal cause of the fault; and
    receiving in the source network device, a multicast message from the NMS, the multicast message identifying a principal cause of the fault, the multicast message being sent by the NMS to each network device in a multicast group of network devices prior to termination of a selected period of time to cause each network device receiving the multicast message to drop related fault messages that would otherwise be sent after waiting for the selected period of time to elapse, thereby minimizing a number of fault messages sent to the NMS.

13. The method of claim 12, further comprising sending redundant multicast messages to the multicast group.

14. The method of claim 13, further comprising dynamically creating the multicast group.

15. A Network Management Station, NMS, the NMS being adapted for:
    receiving fault messages related to a fault in a network coupled to the NMS, the network having a plurality of network devices, wherein the fault messages are generated by the network devices in response to detection of the fault in the network;
    correlating the fault messages to determine a principal cause of the fault; and
    sending, prior to termination of a selected period of time, a multicast message that identifies the principal cause of the fault to network devices belonging to a multicast group, wherein the multicast message is used by each of the network devices in the multicast group to suppress related fault messages for the fault in the network that would otherwise be sent after waiting for the selected period of time to elapse, thereby minimizing a number of fault messages received by the NMS.

16. The NMS of claim 15, being further adapted for defining the multicast group to receive the multicast message in response to the fault occurring in the network.

17. A system, comprising:
    a plurality of network devices and a network management station, NMS, in a network, each of the network devices being adapted for:
    receiving a multicast message from the NMS, the multicast message being sent by the NMS to each network device in a multicast group of network devices prior to termination of a selected period of time, the multicast message being sent by the NMS in response to fault messages relating to a fault in the network, the multicast message identifying a principal cause of the fault;
    detecting in each network device, a network event caused by the fault in the network;
    generating in each network device, a related fault message in response to the detected network event;
    waiting in each network device, for the selected period of time to elapse; and
    determining in each network device, an action to be performed on the related fault message in response to information about the fault from the received multicast message.

18. The system of claim 17, wherein each of the network devices is further adapted for dropping the related fault message if the related fault message has a predetermined low severity level.

19. The system of claim 17, wherein each of the network devices is further adapted for publishing the related fault message if the related fault messages has a predetermined high severity level.

20. The system of claim 17, wherein each of the network devices is further adapted for publishing the related fault message if the multicast message is not received during the selected period of time.

* * * * *